United States Patent [19]

Andric et al.

[11] Patent Number: 5,449,200
[45] Date of Patent: Sep. 12, 1995

[54] SECURITY PAPER WITH COLOR MARK

[75] Inventors: Dragiša Andric; Borislav Stojanovic, both of Montreal, Canada

[73] Assignee: Domtar, Inc., West Montreal, Canada

[21] Appl. No.: 136,315

[22] Filed: Oct. 19, 1993

[51] Int. Cl.[6] .............................................. B42D 15/10
[52] U.S. Cl. ...................... 283/67; 283/91; 283/113; 283/902; 428/916; 156/277; 162/134; 162/140
[58] Field of Search ...................... 283/91, 67, 902, 89, 283/113; 156/277; 162/134, 140; 428/916

[56] References Cited

U.S. PATENT DOCUMENTS

| | | |
|---|---|---|
| 4,143 | 8/1845 | Varnham . |
| 28,370 | 5/1860 | Howell, Jr. . |
| 34,634 | 3/1862 | Hayward . |
| 38,835 | 6/1863 | Olier . |
| 54,835 | 5/1866 | Jones . |
| 61,321 | 1/1867 | Crane . |
| 115,005 | 5/1871 | Willcox . |
| 167,223 | 8/1875 | Casilear . |
| 225,279 | 3/1880 | Hayward . |
| 307,956 | 11/1884 | Jones . |
| 447,336 | 3/1891 | MacDonough . |
| 987,678 | 3/1911 | Howes . |
| 1,431,903 | 10/1922 | Becker . |
| 1,459,259 | 6/1923 | Richardson . |
| 1,818,459 | 8/1931 | Bryan . |
| 2,017,339 | 10/1935 | Bryant et al. . |
| 2,089,293 | 8/1937 | Paine et al. . |
| 2,143,406 | 1/1939 | Chamberlain . |
| 2,148,490 | 2/1939 | Millspaugh ........................... 92/41 |
| 2,656,297 | 4/1949 | Davis, Jr. et al. ................... 154/139 |
| 2,675,339 | 4/1954 | Zenftman ............................. 154/139 |
| 2,801,198 | 7/1957 | Morris et al. ........................ 154/43 |
| 3,081,214 | 3/1963 | Strome ................................. 156/272 |
| 3,196,031 | 7/1965 | Unmuth ............................... 117/15 |
| 3,288,628 | 11/1966 | Schur et al. ......................... 117/38 |
| 3,313,941 | 4/1967 | Marks . |
| 3,451,878 | 6/1969 | Fung et al. . |
| 3,661,700 | 5/1972 | Zilio . |
| 3,675,948 | 7/1972 | Wicker ................................. 283/6 |
| 3,684,643 | 8/1972 | Stepp ................................... 161/160 |
| 3,730,757 | 5/1973 | Knorre ................................. 117/47 |
| 3,880,706 | 4/1975 | Williams . |
| 3,985,927 | 10/1976 | Norris et al. ........................ 428/211 |
| 4,061,468 | 12/1977 | Lange et al. . |
| 4,183,989 | 1/1980 | Tooth . |
| 4,186,943 | 2/1980 | Lee . |
| 4,199,638 | 4/1980 | McKee ................................. 428/131 |
| 4,247,318 | 1/1981 | Lee et al. . |
| 4,303,307 | 12/1981 | Tureck et al. . |
| 4,310,591 | 1/1982 | Lee et al. . |
| 4,351,547 | 9/1982 | Brooks, II . |
| 4,370,057 | 1/1983 | Lee . |
| 4,437,935 | 3/1984 | Crane, Jr. . |
| 4,459,020 | 7/1984 | May et al. ........................... 355/132 |
| 4,462,866 | 7/1984 | Tooth et al. . |
| 4,462,867 | 7/1984 | Fuller . |
| 4,472,627 | 9/1984 | Weinberger . |
| 4,496,961 | 1/1985 | Devrient ............................. 346/206 |
| 4,504,357 | 3/1985 | Holbein et al. . |
| 4,511,616 | 4/1985 | Pitts et al. .......................... 428/203 |
| 4,513,992 | 4/1985 | May et al. ........................... 283/94 |

(List continued on next page.)

Primary Examiner—Frances Han
Attorney, Agent, or Firm—Tobor & Goldstein

[57] ABSTRACT

A security paper is provided for incorporation in a security document, or other document having intrinsic value. The security paper includes a resinous substrate sheet on which indicia are printed. Paper sheets are laminated on either side of the resinous substrate sheet using a suitable adhesive. In the laminated security paper, the indicia printed on the substrate sheet are undetectable when viewed in reflected light, but become apparent when viewed transmitted light within the visible spectrum. The security paper may be incorporated in a security document in which a set of indicia printed on at least one of the outer faces of the paper sheets, such that the indicia on the substrate and the indicia on the document form a total image when viewed in transmitted light. A method for manufacturing the security paper is also provided.

46 Claims, 4 Drawing Sheets

U.S. PATENT DOCUMENTS

| | | |
|---|---|---|
| 4,522,429 | 6/1985 | Gardner et al. . |
| 4,534,398 | 8/1985 | Crane . |
| 4,552,617 | 11/1985 | Crane . |
| 4,578,298 | 3/1986 | Nagafuchi . |
| 4,629,630 | 12/1986 | Devrient .................... 427/7 |
| 4,629,638 | 12/1986 | Nilsson ...................... 428/29 |
| 4,652,015 | 3/1987 | Crane . |
| 4,705,356 | 11/1987 | Berning et al. . |
| 4,756,557 | 7/1988 | Kaule et al. . |
| 4,761,205 | 8/1988 | Crane . |
| 4,780,397 | 10/1988 | Tsuchiya . |
| 4,835,028 | 5/1989 | Dey et al. . |
| 4,837,061 | 6/1989 | Smits et al. . |
| 4,892,336 | 1/1990 | Kaule et al. . |
| 4,897,300 | 1/1990 | Boehm . |
| 4,936,607 | 6/1990 | Brunea et al. ................ 283/70 |
| 4,941,687 | 7/1990 | Crane ............................ 283/91 |
| 4,941,947 | 7/1990 | Guckert et al. . |
| 4,943,093 | 7/1990 | Melling et al. .............. 283/83 |
| 4,944,533 | 7/1990 | Tsuchiya ...................... 283/93 |
| 4,964,951 | 10/1990 | Menyhert ...................... 162/140 |
| 4,988,126 | 1/1991 | Heckenkamp et al. . |
| 5,002,636 | 3/1991 | Crane . |
| 5,020,581 | 6/1991 | Gutierrez . |
| 5,021,318 | 6/1991 | Mayo et al. . |
| 5,033,773 | 7/1991 | Brunea et al. ................ 283/95 |
| 5,055,160 | 10/1991 | Gutierrez . |
| 5,058,925 | 10/1991 | Dotson ........................ 283/95 |
| 5,064,221 | 11/1991 | Miehe et al. ................ 283/67 |
| 5,074,596 | 12/1991 | Castagnoli .................. 283/91 |
| 5,074,962 | 12/1991 | Ishigaki et al. ............ 162/124 |
| 5,078,428 | 1/1992 | Maeno . |
| 5,087,507 | 2/1992 | Heinzer . |
| 5,093,184 | 3/1992 | Edwards . |
| 5,112,672 | 5/1992 | Kaule et al. . |
| 5,161,829 | 11/1992 | Detrick et al. . |
| 5,169,722 | 12/1992 | Nakashima .................... 428/457 |
| 5,176,405 | 1/1993 | Kaule et al. . |
| 5,193,854 | 3/1993 | Borowski, Jr. et al. . |
| 5,199,744 | 4/1993 | Shenton . |
| 5,213,664 | 5/1993 | Hansell ...................... 162/134 |

FOREIGN PATENT DOCUMENTS

| | | |
|---|---|---|
| 87665/82 | 4/1983 | Australia . |
| 34856/84 | 6/1985 | Australia . |
| 44097/85 | 12/1985 | Australia . |
| 49877/90 | 8/1990 | Australia . |
| 84762/91 | 4/1992 | Australia . |
| 31016/93 | 7/1993 | Australia . |
| 0279880A1 | 8/1988 | European Pat. Off. . |
| 0310707A1 | 4/1989 | European Pat. Off. . |
| 0319157A2 | 6/1989 | European Pat. Off. . |
| 0388090A1 | 9/1990 | European Pat. Off. . |
| 0453131A2 | 10/1991 | European Pat. Off. . |
| 0536855A2 | 4/1993 | European Pat. Off. . |
| 0557157A1 | 8/1993 | European Pat. Off. . |
| 3906695C2 | 9/1989 | Germany . |
| 3843077A1 | 6/1990 | Germany . |
| 4041025A1 | 6/1992 | Germany . |
| 4101301A1 | 7/1992 | Germany . |
| 4126051A1 | 2/1993 | Germany . |
| 61-130083 | 6/1986 | Japan . |
| 64-90480 | 4/1989 | Japan . |
| 2-167771 | 6/1990 | Japan . |
| 1095286 | 12/1967 | United Kingdom . |
| 1353244 | 5/1974 | United Kingdom . |
| 1486079 | 9/1977 | United Kingdom . |
| WO90/00980 | 2/1990 | WIPO . |

SECURITY PAPER WITH COLOR MARK

BACKGROUND OF THE INVENTION

1. Field of the Invention

The present invention relates generally to security papers and, more particularly, to a laminated security paper for use in making banknotes, passports, stock certificates, checks and the like.

2. Description of Related Art

A great number of printed documents require highly reliable means of ensuring their authenticity due to some intrinsic value associated with them. These documents range from banknotes to property titles, and include such things as negotiable instruments, stock certificates, checks, and passports. To be truly of value to the user or holder of the document, the means employed to indicate authenticity must be readily and easily detectible. Moreover, to serve the more general purpose of allowing the public at large to rely on the authenticity of the documents, these means should be permanent, durable, and difficult to replicate. This latter quality is particularly important to preclude, or at least to dissuade, attempts at counterfeiting the documents in order to ensure a maximum degree of confidence in the original document. In the case of banknotes, passports,, checks, and other intrinsically valuable documents, confidence in the authenticity of the document is especially important, as any member of the public might become a holder or user of the document at any time. Thus, creators of such intrinsically valuable documents are most often concerned with providing a means by which the public may verify the authenticity of the documents because, ultimately, it is the unsuspecting public who is most at risk of being duped by counterfeits.

Historically, attempts at guaranteeing the authenticity of intrinsically valuable documents have concentrated on two aspects of the documents: (1) the paper employed as the basis for the document, typically referred to in the art as "security paper," and (2) some security feature either incorporated in the paper or added during the transformation of the paper into the final document. Due to their important role in providing lasting documents and a dependable basis for public confidence in the authenticity of such documents, both the security paper and the security feature must respond to numerous, stringent criteria relating to their design and utility. Criteria for security papers include, both physical and optical requirements. The requirements of security features relate not only to their physical properties, but also to the relative difficulty of their replication and to their reliability in guaranteeing the authenticity of the final document.

The physical requirements imposed on security papers, particularly papers used in the manufacture of banknotes, are generally much more strict than for other types of paper. One such requirement is the "basis weight" or the "grammage" of the paper, usually expressed in grams per square meter, or pounds per ream. For most security papers, the basis weight must fall within a fairly narrow range so as to lend sufficient body, or feel, to the document to satisfy the expectations of holders, while allowing the document to be easily folded and unfolded. Closely related to the basis weight is the "caliper," or thickness of the paper, expressed in fractions of a millimeter or inch. It is important that the caliper of the security papers used in any particular application function well with machines, such as automatic teller machines and high speed sorters, which will inevitably handle the final documents.

Strength and durability are crucial properties of security papers because they give the final document its ability to withstand the use, and abuse, likely during its service life. The tensile strength, expressed in units of force per unit width, represents the greatest longitudinal stress a piece of paper can bear without tearing apart. Other strength parameters include wet tensile strength, breaking strength, tearing strength, and folding endurance. Because banknotes are inevitably folded and unfolded many times during their circulation life, high strength and great folding endurance are required of the papers from which they are made. Banknote paper is typically designed to allow some 5,000 to 8,000 folds during its expected circulation life. It should be noted that ratings of security papers based upon the number of folds the papers can endure without tearing may vary widely depending upon the test procedures employed. Moreover, while permitting a considerable number of folds, modern banknote paper must retain some degree of rigidity, or resistance to bending, sometimes referred to as "crispness," to pass successfully through automatic teller machines and high speed sorters.

Other important physical properties of security papers include porosity, printability, and dimensional stability. Because porosity is related to the soilability of a paper, that is, the tendency to absorb or retain impurities, a relatively low porosity is generally desirable for security papers, to increase the likelihood that the document will maintain a clean appearance throughout its useful life. At the same time, security papers require good printability characteristics to ensure accurate and precise impression in the printing processes employed in the manufacture of the final document, as well as proper penetration and adhesion of inks used in the document production. Printing processes used to make certain intrinsically valuable documents may place extreme demands on the paper. Intaglio, or gravure printing, for example, often used in printing banknotes and other documents, involves tremendous pressures between the printing plates and the paper. The paper selected must withstand these processes without loss of physical integrity. Finally, the paper's dimensional stability is important, both during the manufacturing processes and during the service life of the final document. In particular, the paper should not swell or contract excessively due to changes in humidity that typically occur during the manufacturing processes and during ordinary use.

Security papers typically exhibit certain optical properties that affect their usefulness and acceptability to the public. The most important of these properties are the surface characteristics of the paper, and the paper's opacity. Surface characteristics include color, brightness, gloss, finish and smoothness. These parameters are usually specified by the designer of the final document based upon the aesthetics desired in the document; and various processes, such as coating and calendering, may be used to obtain the desired appearance and feel. The opacity of the paper refers to the relative inability of light to pass through the paper. Opacity is generally represented in terms of the percentage of the light incident on one side of the paper that is not transmitted through the paper to an observer on the other side, but is reflected or absorbed by the paper. High opacity, that is, in excess of about 75%, is generally desirable for security papers. However, variations in opacity may actually serve as security features in the final document, as in the case of watermarks, wherein the image or mark, visible in transmitted light, is formed by causing the paper to take on different levels of opacity in such a way as to define a recognizable mark.

The selection and specification of the security feature to be incorporated into an intrinsically valuable document is often intimately related to the specification of the security paper in connection with which it is to be used. There are several reasons for this. First, the security feature is often a quality of the paper itself, such as a watermark or a particular paper composition. Even where the feature may be said to constitute an element separate from the paper, such features are often imbedded in the paper during the papermaking process. This is true for a great number of security features, including so called security threads, chemical additives, colored confetti, and thin tapes containing microtext or other indicia. In addition, even surface-applied security features must be compatible with the underlying paper to provide the desired adhesion and durability characteristics to the resulting document. Such surface-applied security features include non-reproducible images, such as line art that produces moire patterns when photocopied, photosensitive coatings, and surface decals. Even intricate line art printed on the face of the document may constitute a security feature by virtue of the difficulty with which it is replicated. In all cases, however, the security feature must function well with the security paper selected.

The criteria for an effective document security feature are relatively easy to formulate. Such features should be difficult to replicate to deter potential counterfeiters, or at least to render the fruit of their enterprise less passable to the public. The features should permit ready detection by means available to ordinary holders or users of the final document. For banknotes and other documents on whose authenticity the public at large relies, the features should be discernible and verifiable under ordinary light conditions. Finally, in certain cases, it may be desirable that the security feature afford detection of the movement of large quantities of documents, such as banknotes.

While these criteria may appear straightforward, developing a security feature that reliably satisfies them is not an easy task. Historically, the production of an effective security feature for documents relied upon specialized knowledge or ability possessed by only a tiny segment of the public. Thus, for centuries the rare talents of the master engraver and the specialized knowledge of the printer sufficed to prevent or deter most forgery attempts. Later, the combination of specialized knowledge of several disciplines into the same document became the key to preventing counterfeiting by all but the most determined and able teams of forgers. However, modern advances in color photocopying, scanning, and offset printing technologies have made the production of very convincing counterfeits possible even without such specialized knowledge. To be truly effective against forgery, security features must now be not only difficult to replicate due to the specialized knowledge required for their production, or due to a combination of specialized fields into a single document, but must be very difficult or impossible to duplicate on sophisticated photocopying machines.

Finally, to be useful in producing intrinsically valuable, documents, the security paper and the security feature incorporated in or on the paper must together be capable of transformation into a aesthetically pleasing document, at commercial rates and at a reasonable cost. The governmental, quasi-governmental, and corporate entities that generally issue such documents demand no less than that their documents reflect the character of their issuer and inspire the utmost confidence by both their functionality and their appearance. Thus effective security papers and security features should offer a wide degree of freedom in the design and execution of the final document.

A number of approaches have been proposed in the past for providing a security paper with effective security features. May of the proposed security papers incorporate security features during the papermaking process, that is, on the papermaking machine while the web of the security paper is being formed. Such papers make use of security features such as water marks, security threads, security tapes with or without microtext, confetti, and other devices embedded in the paper prior to completion of the papermaking operation. However, such security papers generally cannot provide a security feature covering the entire surface of the security paper due to the need to drain moisture, from the paper during final processing. In addition, security features such as confetti are not generally localized within the security paper, as is required in many applications. Although security features such as security tapes and threads may be localized in the papers, these devices can cause difficulties in printing, sheeting and other process steps due to the increased local thickness in the paper resulting from their presence.

Another approach to incorporating a security feature in security paper is to laminate finished paper sheets to form a composite security paper. One such security paper is described in U.S. Pat. No. 5,161,829. In that security paper, at least two paper sheets are laminated to form a security paper with an authentication indicator incorporated in the laminate. The authentication indicator is printed on the inner surface of at least one of the paper sheets prior to lamination, and is detectible in transmitted light, but not in reflected light. However, printing authentication indicators on one of the paper sheets can lead to problems with "show-through," or bleeding of the inks used to print the authentication indicators, through the paper sheets to the surface of the security paper. Furthermore, where printing is done on a thin inner paper sheet, this would usually involve the use of thin inks, resulting in substantial masking of the security feature by surface priming and making the security feature less visible or not visible at all. Moreover, the use of paper sheets in the laminate does not result in a composite security paper having physical properties beyond those attainable with more conventional single-web papers. In particular, properties related to circulation life, including folding endurance and tearing strength, are in no way enhanced in the resulting laminate.

Another laminated paper product incorporating a security feature is described in Japanese laid-open application no. 322109/88. That product, a card stock formed by laminating two relatively thick paper sheets on either side of a synthetic substrate, incorporates machine-readable marks on the substrate material. The marks, such as universal product codes, are printed in inks that do not permit transmission of light of near infrared wavelengths. Other marks are printed on the substrate in near infrared-transmitting inks. The resulting marks are not distinguishable in visible light, but can be distinguished and read when the cards are passed between a light emitting diode of the proper wavelength and a photoreceptor. However, the cards described are not intended, nor are they suitable for use as security paper, due to the stiffness and low folding endurance inevitably resulting from their physical structure. Moreover, the security feature taught in this document is not readily discernible to a holder under ordinary light conditions. On the contrary, the marks printed on the substrate cannot be discriminated in visible light and are thus of no use to the ordinary holder without special detection means.

The present invention is directed to overcoming or minimizing the drawbacks of the existing techniques set forth above, and to providing a security paper for documents with intrinsic value having security features that can be readily distinguished by the public, but that are not susceptible to replication by counterfeiters. The invention provides a security feature in the form of a color mark, not obtainable by prior art processes or in known security papers. Furthermore, the invention offers a security paper of substantially uniform thickness, facilitating conversion operations such as printing and sheeting, and allowing the paper to perform well in high speed sorters and automatic teller machines. Moreover, the invention provides security features which may be localized where desired. The security feature may be employed alone or in conjunction with known security devices.

SUMMARY OF THE INVENTION

In accordance with one aspect of the invention, there is provided a security paper that includes a resinous substrate sheet having two faces. Indicia are disposed on one of the faces of the resinous substrate sheet, and two paper sheets are permanently laminated on each of the faces of the substrate sheet. In the resulting laminate, the indicia on the substrate sheet are substantially undetectable when viewed in reflected light and are apparent through the security paper when viewed in transmitted light within the visible spectrum.

In accordance with another aspect of the present invention, there is provided a laminated security paper having a resinous substrate layer with a first and a second face. A layer of color indicia is disposed on the first face of the substrate layer. The layer of color indicia includes at least one region having a color corresponding to a wavelength of light from 380 to 720 nanometers. A first adhesive layer is disposed on the first face of the substrate layer over the layer of color indicia. A second layer of adhesive is disposed on the second face of the substrate layer. A first layer of paper is disposed over the first adhesive layer and fixed permanently to the substrate layer and to the layer of color indicia by the first adhesive layer, while a second layer of paper is disposed over the second adhesive layer and permanently fixed to the substrate layer by the second adhesive layer.

In accordance with a further aspect of the invention, there is provided a security document that includes a resinous substrate sheet having two faces. Indicia are disposed on one of the faces of the substrate sheet. The security document also includes two paper sheets, each having an inner face and an outer face. One of the paper sheets is permanently laminated on each of the faces of the substrate sheet by means of an adhesive applied between the faces of the substrate sheet and the inner faces of the paper sheets. A set of indicia is printed on at least one of the outer faces of the paper sheets, whereby the indicia on the substrate sheet cooperate with the set of indicia printed on the outer face of the paper sheet to form a total image when viewed in transmitted light.

In accordance with still another aspect of the present invention, there is provided a method for manufacturing a security paper including a first step of defining a graphic design in color. The graphic design is then printed on a resinous substrate sheet as a substantially transparent color image. The resinous substrate sheet is then laminated between two thin paper sheets by means of a suitable adhesive.

BRIEF DESCRIPTION OF THE DRAWINGS

The present invention will become more fully understood from the following detailed description, taken in conjunction with the accompanying drawings, wherein like reference numerals refer to like parts, in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF THE PREFERRED EMBODIMENTS

Figure 1:
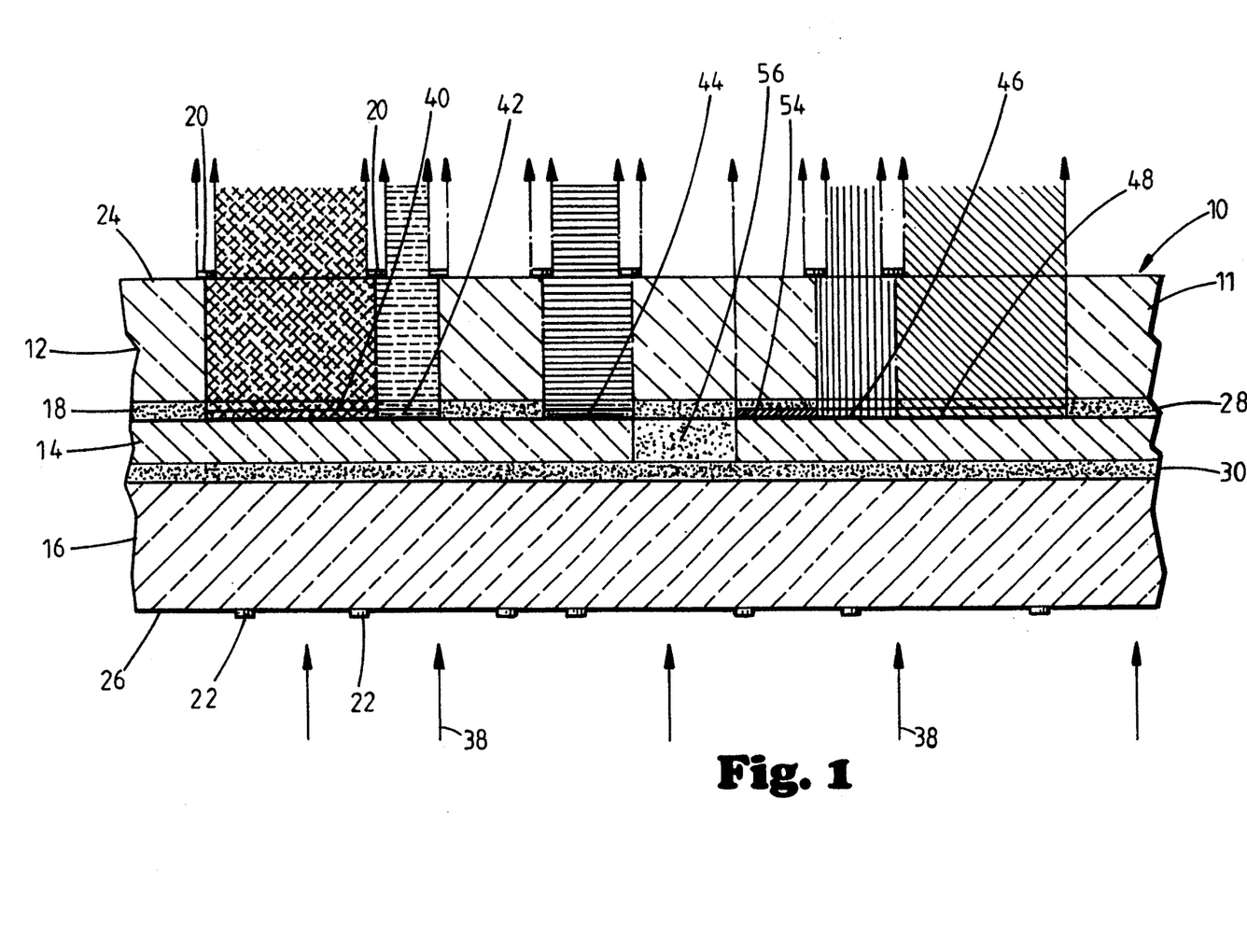
FIG. 1 is a partial vertical section of a laminated security paper in accordance with the present invention, depicting the various layers of the laminate and their interaction in transmitted light.

Turning now to the drawings and referring to FIG. 1, a laminated security paper, designated generally by the reference numeral 10, is depicted in partial vertical section to illustrate the layers of which the paper 10 is comprised. As depicted in FIG. 1, the security paper 10 is intended ultimately to be incorporated in a final document 11, such as a banknote, stock certificate, check, passport, or any other intrinsically valuable document for which authenticity ensuring features are desirable. It should be noted that the present security paper 10 may also find applications in other areas as well, including corporate letterhead, paper for occasional invitations, and the like. The security paper 10 includes a first paper sheet 12, a substrate sheet 14, and a second paper sheet 16. Indicia, designated collectively by the reference numeral 18, are disposed on one surface or face of the substrate sheet 14 prior to lamination of the three sheets 12, 14, 16. A set of indicia 20, 22 may be disposed on the outer faces 24, 26 of either, or both of the two paper sheets 12, 16, as illustrated in FIG. 1. Although reference is made to the indicia 18, 20, 22 in the plural throughout the present description and in the claims, it should be understood that the "indicia" 18, 20, 22 may, in fact, constitute a single "indicium," or image, on the substrate sheet 14 or on either of the paper sheets 12, 16. As will be more fully described below, the indicia 18 on the substrate sheet 14 are preferably designed and disposed on the substrate sheet 14 in such a way as to register and cooperate with some, or all of the set or sets of indicia 20, 22 on the paper sheets 12, 16 to form a "total image," such as a color picture, when viewed in transmitted light.

The substrate sheet 14 is preferably a thin, transparent, resinous sheet material. Synthetic materials, such as polyester or polypropylene, or organic resinous materials such as cellophane, may be used for the substrate sheet 14. At present, polyester film material is generally preferred for the substrate sheet 14, such as a polyester film manufactured by E. I. Du Pont de Nemours Company and commercially available under the tradename Mylar. The substrate sheet 14 preferably has a basis weight of between 11.0 and 22.5 grams per square meter, inclusive, and a thickness, or caliper of from 8 to 16 microns. For the best performance, both during later converting operations and during use when incorporated into the laminated security paper 10, it is desirable that the substrate sheet have good dimensional stability, of the order of −1.5% (150° C., 30 min.). Information on such dimensional stability properties are commonly available from film suppliers. Resinous sheet material meeting these specifications is available commercially in a number of forms, including rolls, from a variety of manufacturers, including E. I. Du Pont de Nemours and Company, Imperial Chemical Industries Plc, Eastman Kodak Company, and 3M.

The paper sheets 12, 16 incorporated in the security paper 10 are preferably high opacity, thin paper. The basis weight, or grammage, of the paper sheets 12, 16 is preferably in a range from 19 to 50 grams per square meter, inclusive, with a grammage of about 34 grams per square meter being presently preferred. The thickness of the sheets 12, 16 is preferably included in a range from 0.038 millimeters to 0.050 millimeters, inclusive. The paper sheets 12, 16 may typically include fibrous raw materials, such as cotton, flax, hemp, and wood fibers, or a mixture of such fibers and cellulosic materials, such as wood cellulose. The paper composition presently preferred is a combination of 75% cotton textile fibers and 25% wood cellulose. However, it should be understood that the present security paper 10 is not limited to any particular composition of the paper sheets 12, 16, and in specific applications, the precise composition of the paper sheets 12, 16 may be specified by the eventual issuer of the final document 11. In such cases, additional security features (not shown), such as polyester, rayon, or nylon fibers, fine huing pigment, and certain chemical additives may be incorporated in the paper sheets 12, 16 without substantially affecting the operation of the present color marks as security features.

The opacity of the paper sheets 12, 16 is preferably at least 75%, with opacities in a range of from 75 to 85% providing good results when incorporated in the laminated security paper 10. To obtain such opacity levels in very thin paper, fillers and pigments may be advantageously added during the papermaking operation. Titanium dioxide may be suitably employed as a pigment, along with numerous other substances, such as calcium carbonate. One such titanium dioxide filler is commercially available under the tradename "Titanox" RA 50 from Kronos of Canada.

The paper sheets 12, 16 may be manufactured by any suitable papermaking process. While Fourdrinier machines are generally preferred for the manufacture of the paper sheets 12, 16, due to the high quality paper such machines are capable of producing, other types of machines, such as cylinder machines may also be used. For good wet strength properties, wet strength resins are preferably added during the papermaking process. Such resins include melamine-formaldehyde resins, such as resins available from American Cyanamid Company and marketed under the tradename "Parez" resins 607 and 613, or resins available from Hercules Inc. under the tradename Kymeme, such as Kymeme 450.

Once the substrate indicia 18 have been disposed on the substrate sheet 14, as will be described in greater detail below, the paper sheets 12, 16 are laminated on either face of the substrate sheet 14. To laminate the paper sheets 12, 16 to the substrate sheet 14, a suitable adhesive is applied between the faces of the substrate sheet 14 and the inner surface of the paper sheets 12, 16, and the three sheets 12, 14, 16 are pressed in a laminating machine where the adhesive is cured, as will be described below.

Good adhesion of the paper sheets 12, 16 to the substrate sheet 14 is important to the effectiveness of the security paper 10 in preventing or deterring counterfeiting attempts. Specifically, the laminated security paper 10 should not be susceptible of delamination that could expose the substrate indicia 18 to copying. Any suitable adhesive that, when cured in the laminate, will preclude delamination of the security paper 10 may be used. The adhesive may be a single component adhesive, or a double or multiple component glue. Ultraviolet curing or electron beam curing adhesives may also be employed. Because the substrate indicia 18 should selectively cooperate with the surface indicia 20, 22, without interference from the adhesive, the adhesive is preferably transparent.

The particular adhesive employed should be compatible with the substrate material and with the paper sheets used in the security paper 10. Adhesive manufacturers can generally supply compatibility and suitability information of this type. Depending upon the specific adhesive used, adhesive may be applied either to paper sheets 12, 16, or to the faces of the substrate sheet 14, or to both the paper sheets 12, 16 and the substrate sheet 14. Polyurethane based adhesives are generally preferred, and an adhesive available from Imperial Chemical Industries Plc of Great Britain, and marketed under the tradename Novacote ADH 222 has been employed satisfactorily. The coverage rate of adhesive is preferably within the range of 1.5 to 3.0 grams per square meter, but consumption rates may vary with the type of adhesive used.

Figures 3, 4:
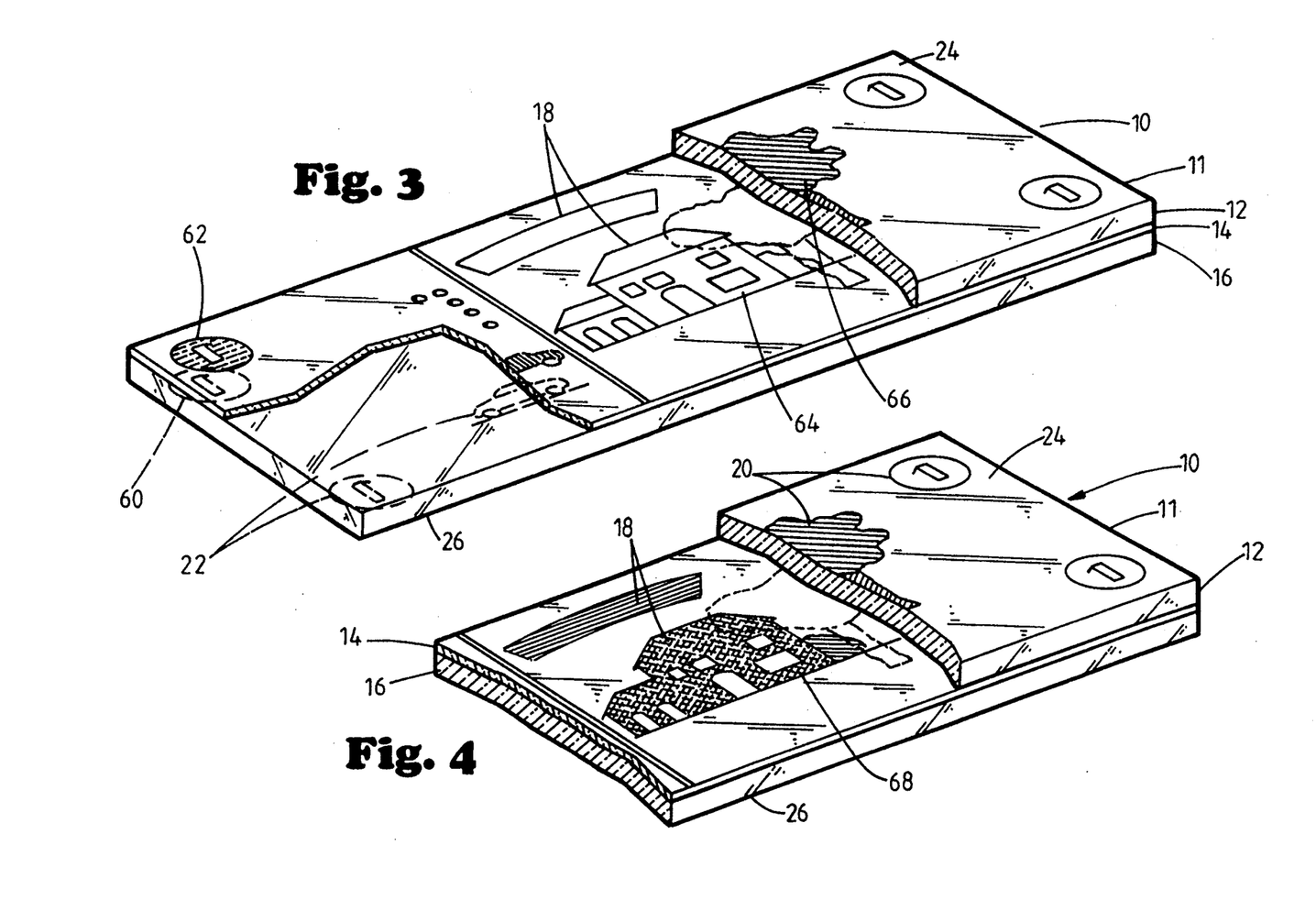
FIG. 3 is a perspective view of a banknote incorporating the security paper in accordance with the invention, with portions of the paper removed to illustrate certain cooperative effects possible between indicia on the various sheets or layers of the paper.
FIG. 4 is a perspective view of a banknote incorporating the security paper of the invention, with portions of the paper removed to show a further cooperative effect possible between the indicia.

The substrate indicia 18 are preferably disposed on the substrate sheet 14 by printing. For this, a graphic design for the indicia 18 is prepared according to any motif desired in the final security document 11. These indicia 18 will often comprise an image, as illustrated in FIGS. 3 and 4, but may also include numerals, words, symbols, or any number of these in combination. The indicia 18 may comprise black and white indicia, or may include a full range of visible colors, and may cover the entire surface of the substrate sheet 14, or may extend over only certain regions. Where the indicia 18 on the substrate sheet 14 are intended to cooperate with a set of indicia 20, 22 on either of the paper sheets 12, 16, transparent ink is generally preferred to define the substrate indicia 18. As will be discussed in more detail below, the use of transparent ink permits an observer viewing the security paper 10, or the final document 11, in transmitted light, to perceive a total image in color, created by cooperation of the transparent color indicia 18 on the substrate sheet 14 and the set of indicia 20, 22 on the paper sheet 12, 16.

Figure 5:
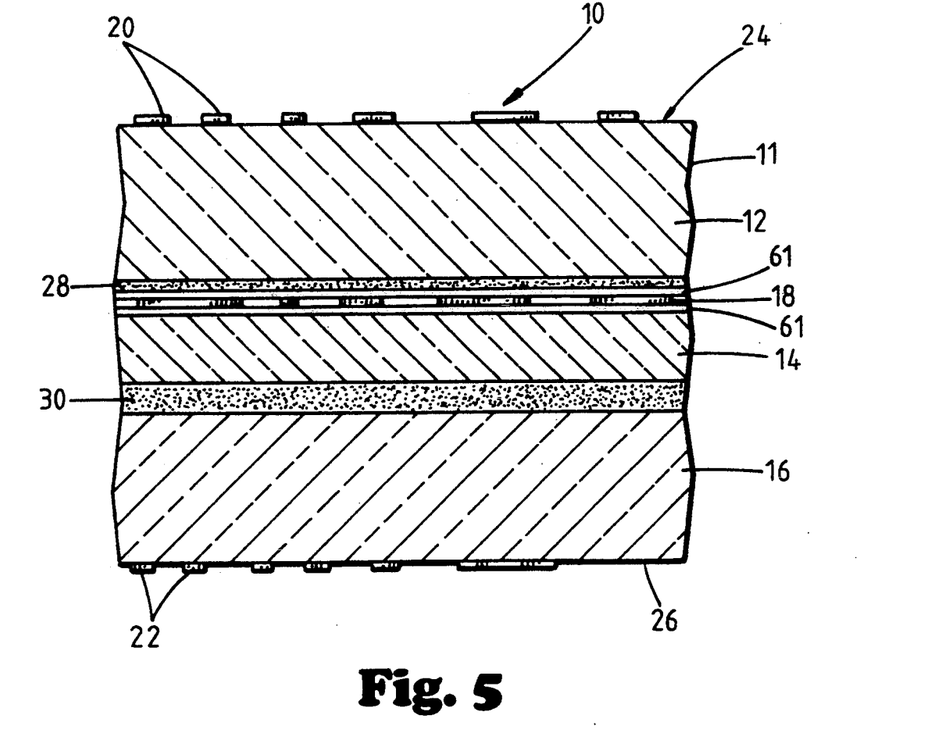
FIG. 5 is a partial vertical section of a laminated security paper in accordance with one embodiment of the invention, illustrating a layer of white, or substantially opaque ink, above and below the transparent color indicia.

The substrate indicia 18 may advantageously include a layer of white, or substantially opaque ink above and-/or below the transparent color indicia. Such white layers are preferably disposed on both sides of the transparent color ink. Security paper 10, as shown in FIG. 5, includes a layer of white, or substantially opaque ink 61 disposed above and below the transparent color indicia 18. These white layers serve two functions. First, they increase the opacity of the security paper 10, while nevertheless permitting the substrate indicia 18 to be viewed in transmitted light. Secondly, such layers provide an additional security feature in case the security paper 10 is delaminated. While the security paper 10 is extremely resistant to any efforts at delamination, should a paper sheet 12, 16 be removed by counterfeiters attempting to copy the substrate indicia 18, the white layers would preclude reproduction of the color indicia. Any further effort to access the color indicia by removal of the white layer would result in destruction of the color indicia, thwarting the counterfeiting enterprise.

An important aspect of the present security paper 10 is its ability to permit verification of authenticity by any holder and under normal light conditions. Because the human visible spectral range corresponds to light wavelengths from about 380 to 720 nanometers, the inks employed for the substrate indica 18 are preferably colored, transparent inks, whose colors also correspond to wavelengths within this range. Use of transparent inks for substrate indicia 18 is also advantageous because practically no light will be reflected from indicia 18, thereby making photoreproduction of indicia 18 of the quality required for counterfeiting impossible.

Other optical effects may be obtained in the security paper 10 by printing some or all of the indicia 18 with fluorescent or phosphorescent inks, such as inks visible under ultraviolet light only. Where ultraviolet inks are used to form part of the substrate indicia 18, indicia printed with such ink may be substantially undetectable under normal conditions, but visible under ultraviolet light. Alternatively, selected portions of the substrate sheet 14 may be made opaque by the use of non-transparent inks, such as non-transparent white ink, or by metallizing, for instance by vapor metal deposition on the surface of the substrate sheet 14. The use of the latter techniques is particularly useful in forming microtext as part of the indicia 18, clearly visible in the security paper 10 only in strong transmitted light, but substantially undetectable in reflected light. Finally, the indicia 18 may advantageously include areas primed with magnetic ink that serves the dual purpose of forming a part of the total image observed in transmitted light and providing an additional security feature detectible by magnetically sensitive detection devices of the type generally known in the art.

The design of the substrate indicia 18 in the security paper 10 permits a great degree of flexibility in the design of the security feature that the final document 11 will incorporate by virtue of the total image mentioned above. For example, the indicia 18 may present areas that resemble watermarks in the final document, but in any visible color or any combination of colors. Alternatively, color indicia 18 may add color detail to a set of indicia 20, 22 provided on one or both outer faces 24, 26 of the paper sheets 12, 16 when viewed in transmitted light. In such cases, at least portions of the surface indicia 20, 22 may also be printed with transparent inks. As will be discussed in greater detail below, where transparent inks are used in both the substrate indicia 18 and surface indicia 20, 22, the color of the substrate indicia 18 will dominate in the total image when viewed in strong transmitted light, whereas the color of the surface indicia 20, 22 alone will be visible when the final document 11 is viewed in reflected light. This is true even where substantially opaque layers are disposed adjacent the color regions, as has been described. Portions of the surface indicia 20, 22 may become substantially invisible when viewed in transmitted light, due to the dominance of the substrate indicia 18. Similarly, substrate indicia 18 in transparent colors may provide a colored background, such as a rainbow or color corporate logo, against which surface printed indicia 20, 22, appear when viewed in transmitted light. For instance, surface indicia 20, 22 may be line art or printed words, such as a company name, not necessarily overlying substrate indicia 18. As will become apparent through the following discussion, although disposed on only one face of the substrate, 14, the substrate indicia 18 may register and cooperate with surface indicia 20, 22 on either of the paper sheets 12, 16, or on both paper sheets.

Figure 2:
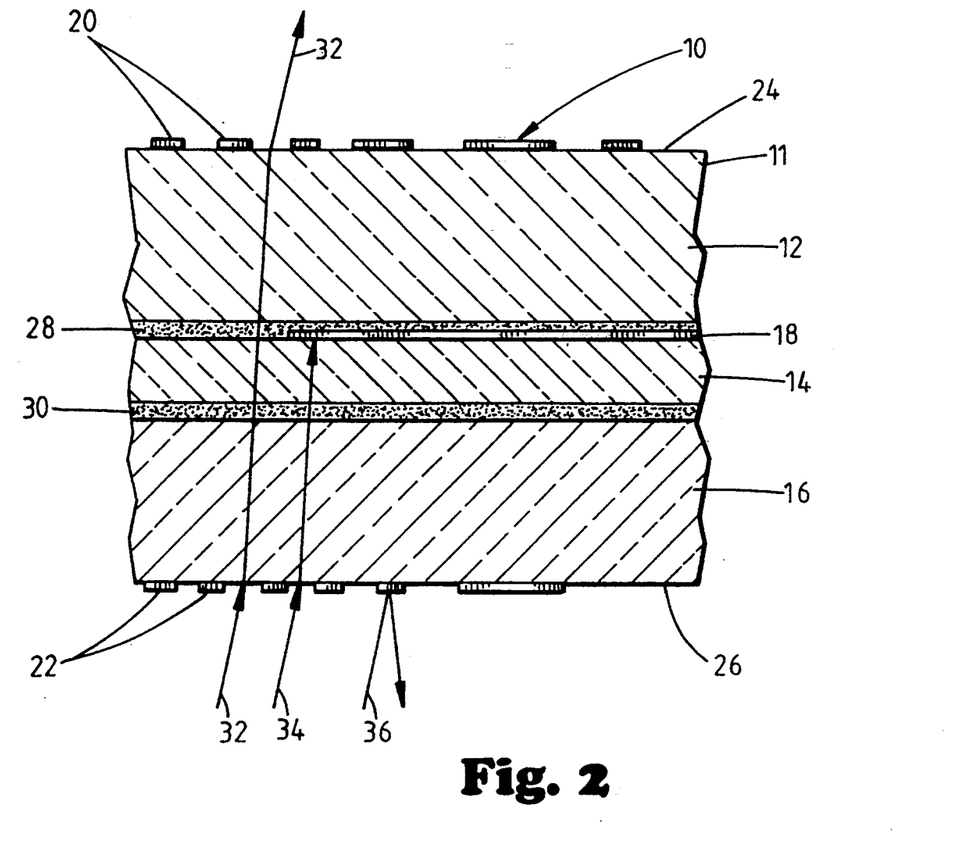
FIG. 2 is a partial vertical section of a laminated security paper in accordance with the invention, illustrating the reflection, absorption, and transmission of light incident on one surface of the paper.

FIGS. 1 and 2 illustrate in greater detail the operation of the various layers of the security paper 10 under reflected and transmitted light regimes. As shown in FIGS. 1 and 2, the laminated security paper 10 includes a substrate layer 14, a layer of indicia 18 disposed on one of the faces of the substrate layer 14, a first paper layer 12 permanently fixed over the layer of indicia 18, and a second paper layer 16 permanently fixed over the other face of the substrate layer 14. Adhesive layers 28, 30 serve to bind the substrate layer 14 to the paper layers 12, 16. As described above, in the final document 11 incorporating the security paper 10, surface indicia 20, 22 are printed on the exposed surface 24, 26 of either or both of the paper layers 12, 16.

Light, such as white light including components of wavelengths between about 380 and 720 nanometers, incident on the security paper 10 is either transmitted through the paper, absorbed by the paper, or reflected. As represented by the line 32 in FIG. 2, transmitted light passes through all layers of the security paper 10 and emerges from the surface 24 of the paper opposite the surface 26 through which the light entered. Absorbed light, represented by the line 34 in FIG. 2, penetrates into the security paper 10, but is dispersed and absorbed by the paper fibers, and by any pigments and fillers included in the paper to increase opacity. Reflected light, represented in FIG. 2 by the line 36, does not penetrate into the security paper 10, but rebounds from the surface 26 of the paper and from any indicia 22 applied to the surface 26.

In the security paper 10 as illustrated in FIG. 2, an observer situated on the same side of the paper as a light source (not shown) from which the lines 32, 34, 36 might originate, perceives only the reflected light 36, whereas an observer on the opposite side of the security paper 10 from the light source sees transmitted light 32. Because absorbed light 34 is effectively trapped in the layers of the security paper 10, it is not perceived by either observer. Due to the high opacity of the paper layers 12, 16 in the present security paper 10, virtually all light penetrating into the security paper 10 is either transmitted through the layers of the security paper 10, or absorbed in the paper layers 12, 16. Because practically no light reflects from the substrate indicia 18, the indicia 18 remain virtually imperceptible to an observer examining the security paper 10 in reflected light, and photoreproduction of the substrate indicia 18 of the quality required for counterfeiting is impossible.

The cooperation among the substrate indicia 18 and the surface indicia 20, 22 in transmitted light is illustrated in FIG. 1 and may be summarized as follows. Some amount of the light 38 incident on the security paper 10 penetrates into the paper through the surface 26 and is transmitted through the paper layer 16, the adhesive layer 30, and the substrate layer 14 to impact the substrate indicia 18. Regions 40, 42, 44, 46, 48 of transparent color in the substrate indicia 18, whose color preferably corresponds to the visible spectral colors having wavelengths of between about 380 and 720 nanometers, absorb certain frequencies of the transmitted light depending upon the color of transparent ink applied to the region, and transmit the remainder of the light. This colored light, represented in FIG. 1 by the shaded areas, is then transmitted through the adhesive layer 28 and the paper layer 12, and emerges from the surface 24 of the security paper 10.

Where the surface indicia 20 comprise no transparent, color indicia, the light emerging from the security paper 10 is of substantially the same color as the region 40, 42, 44, 46, 48 of the substrate indicia 18 through which the light passed. In areas of the surface indicia 20 covered by transparent colored ink, the color of the transmitted light emerging from the paper is primarily that of the substrate regions underlying those areas. The total image observed emerging from the security paper 10 in transmitted light is, therefore, a combination of the image created by the substrate indicia 18 and the surface indicia 20. The stronger the transmitted light 38 incident on the security paper 10, the more the image created by the substrate indicia 18 will tend to dominate over the image created by the surface indicia 20.

FIG. 1 also illustrates how other optical effects may be incorporated into the security paper 10. In lieu of transparent ink, the substrate indicia 18 may comprise regions 54 made opaque by metallizing or by printing with non-transparent ink. Such regions 54 will, of course, effectively stop all transmitted light and thus produce dark regions in the total image perceived. Alternatively, the substrate 14 may be perforated, in certain regions 56. Such perforations will become filled with adhesive during the lamination of the various layers of the security paper 10. Because the adhesive is preferably transparent, such perforated regions 56, will transmit light without alteration.

Examples of these cooperative effects are illustrated in FIGS. 3 and 4. In FIG. 3, line art comprising the numeral "1" surrounded by a circle (depicted by dashed lines 60) is shown as it might be printed in a lower corner of the outer surface 26 of the paper sheet 16, with a similar encircled numeral "1" being printed in an upper corner of the same surface 26. Colored regions 62 (only one such region shown in FIG. 3) on the substrate sheet 14 are positioned to register with and to overlie the encircled numeral on the paper surface 26. In this arrangement, an observer viewing the outer surface 26 of the final document 11 in reflected light would perceive only the surface indicia 22, 60. When the same document 11 is viewed from the same side, but with a light source located on the opposite side of the document from the observer, the total image perceived by the observer would include the line art 60, colored by the colored regions 62 on the substrate.

A similar arrangement is depicted in FIG. 3 for substrate indicia 18 representing a building and landscape 64. An image 66 printed on the outer surface 24 of the paper sheet 12 may include line art and transparent ink covering some or all of the surface of the image 64. As in the previous example, an observer viewing the document 11 in reflected light would perceive only the image 66 as it appears on the surface 24 of the paper sheet 12, and in the colors printed on the surface 24. Viewing the document 11 in transmitted light, however, the observer would perceive a total image made up of the surface image 66 combined with the substrate image 64. Generally, the greater the intensity of the light used to view the document 11 in the transmitted light regime, the more the substrate image 64 will dominate in the total image perceived by the observer. Where desired, the surface indicia may even become substantially invisible when the document is viewed in transmitted light, due to the dominance of the substrate image 64 in the total image.

Another example of the cooperative effects of the substrate indicia 18 and the surface indicia 20, 22 is illustrated in FIG. 4. As mentioned above, the design and placement of the substrate indicia 18 need not be identical to the design and placement of the surface indicia 20, 22. As shown in FIG. 4, a security feature incorporated in the security paper 10 may consist in a "ghosting" effect induced by the substrate indicia 68 when viewed in transmitted light. In such cases, the surface indicia 20, 22 need not include line art or other indicia specifically "colored" by the substrate indicia 18 in the total image.

The preferred method for making the security paper 10 will now be described. Because the substrate indicia 18 form a total image in combination with the surface indicia 20, 22 disposed on the security paper 10 in the final document 11, the process for manufacturing the security paper 10 generally begins with the graphic design of all indicia 18, 20, 22 to be printed on the substrate sheet 14 and paper sheets 12, 16. Alternatively, the graphic design for the substrate indicia 18 may be prepared independently of the surface, indicia 20, 22, particularly where a standard paper is used by an issuer for a number of different final documents. In either case, the graphic design for the substrate indicia 18 may be prepared by an artist-designer based on any color picture or motif, and may incorporate a full range of visible colors and details. In developing the graphic design, the designer may specify that the design be precisely placed in the security paper 10, or continuously or repetitively printed on the substrate 14. As has been described above, the graphic design for the substrate indicia 18 may include areas of color over which surface indicia 20, 22, including text, will be printed in the final document 11.

In addition to color marks and images, the graphic designer may include in the substrate indicia 18 regions of microtext, portraits or words resembling water marks printed in non-transparent or transparent white ink, and designations printed in fluorescent, phosphorescent, or magnetic ink. Moreover, the design may include perforations in the substrate sheet 14 designed to permit transmitted light to pass unaltered. Metallized regions may also be provided in the design to render the substrate sheet 14 opaque.

The graphic design is processed in order to convert it to a printable form. This is preferably accomplished by electronic color separation. A number of suitable color separation devices are known, including laser analyzers and scanners. Such devices transform the design into pixels, or an array of minute points, containing primary colors. The color separation devices also determine the intensity of the coloration of the pixels, and encode and store the image thus analyzed.

Once the color separation is complete, priming plates or cylinders are prepared for printing the substrate indicia 18 onto one face of the substrate sheet 14. The preferred priming process is rotogravure reproduction. The electronic color separation device is preferably used either for direct cylinder engraving, or for controlling the exposure time of photosensitive material in an indirect process for chemically engraving a rotogravure cylinder. Color synthesis in the printed substrate indicia 18 is accomplished by means of separate rotogravure cylinders for each transparent color, and for any non-transparent or magnetic inks called for in the graphic design. The engraving depth on the rotogravure, cylinder is typically in a range of from 3 to 32 microns.

Prior to printing the substrate indicia 18 on the substrate sheet 14, the substrate sheet is preferably given a Corona electric discharge treatment to improve the adherence of the ink to the substrate sheet 14. Corona treatment has also been found to enhance the adherence of the paper sheets 12, 16 that will be laminated on the substrate sheet 14 later in the manufacturing process. This Corona treatment may be carried out in any suitable apparatus readily available commercially for treating thin films, such as treaters available from Sherman Treaters North America Inc.

Optionally, the substrate sheet 14 may be metallized or perforated prior to printing, if called for in the graphic design of the substrate indicia 18. Vapor deposition techniques are preferred for metallizing, and all or a portion of the substrate sheet 14 may be exposed to such deposition. Perforation of the substrate sheet 14 may be used to form text, specific designs, or dotted contours to provide an added security feature. Such perforation is generally carried out on special perforating machines having needles, typically 0.8 to 1.0 millimeters in diameter, that pierce the substrate sheet 14. Where a perforated pattern is designed to cooperate with a printed or metallized area on the substrate sheet 14, the perforating step is preferably carried out after completion of the printing and metallizing; steps. Such perforation may be carried out on any suitable machine, such as machines available commercially from Zimmermann & Co. of Berlin, Germany.

The substrate sheet 14 is then printed with the substrate indicia 18, allowing sufficient time between printing stages to allow inks to dry. For printing, as for the other conversion steps in the preparation of the security paper 10, the substrate sheets 14 preferably processed from a roll of resinous film or foil. Processing the substrate material in roll form facilitates the printing and lamination steps, and permits the process to be carried out in production quantities and at a reasonable cost.

The printed substrate sheet 14 is next laminated between two paper sheets 12, 16 to form the security paper 10. In a presently preferred arrangement for laminating the security paper 10, lamination is accomplished in a laminating station consisting of a laminating machine of the type generally known, and a tunnel-type adhesive curing section. Such laminating machines are commercially available from a number of manufacturers, such as Cerruti of Italy. To form the laminate, two sheets of thin, high opacity paper are fed into the laminating station, preferably from continuous rolls, and the printed substrate sheet 14 is fed into the station between the paper sheets. Adhesive is continuously applied to either the faces of the substrate sheet, or to the surfaces of the paper sheets facing the substrate sheet depending upon the adhesive employed, and the sheets are pressed by nip rolls to form a laminate. The laminate proceeds through the curing section where the adhesive is cured to permanently bond the laminated layers. The precise design of the curing section depends upon the adhesive employed, and the curing conditions recommended by the adhesive manufacturer.

The security paper, exiting from the laminating station as a continuous sheet, may be rolled for later cutting into sheets, or may be sheeted directly as it is produced. Any suitable sheeting device may be employed for this, such as a Pasaban sheeter. The format set on the sheeter will depend upon specifications set by the end user of the security paper 10, and ultimately upon the size of the document to be made from the security paper.

After sheeting, counting and quality control operations may be performed, and the surface indicia 20, 22 may be printed on one or both sides of the security paper 10. The security paper 10 is suitable for intaglio printing, generally preferred for such documents as banknotes, as well as for multicolor offset printing. Where registration between the substrate indicia 18 and the surface indicia 20, 22 is desired, registration marks are preferably incorporated in the substrate indicia 18, and printing on the security paper 10 is registered in generally the same manner as for known water marks.

The foregoing method has been found to produce high quality security paper with physical and optical properties generally comparable to or surpassing those of known security papers. The substrate indicia 18 are substantially undetectable when the security paper 10, or the final document 11, is viewed in reflected light, and clearly visible when viewed in transmitted light. The stability of the colors comprising the substrate indicia 18 is very good, particularly where similar pigments are used to print these indicia 18 as are employed for making banknotes and other security documents. Because the indicia 18 are printed on the substrate sheet 14, and the substrate indicia 18 are separated from the paper sheets 12, 16 by the adhesive layers 28, 30 in the laminated security paper 10, show-through of the substrate indicia 18 is avoided. Moreover, the rate at which the present security paper can be produced exceeds the production rate typical for security papers bearing water marks.

The security paper 10 offers a number of additional security features as compared with known security papers. Due to the practical difficulty in printing on thin resinous films, and in producing very thin, high opacity papers, only a tiny sector of the public will possess the knowledge and machinery needed to replicate the security paper. In addition, the inability to photoreproduce the substrate indicia 18 effectively precludes duplication by photocopying. On the other hand, the total image perceived by observing the final document 11, produced from the security paper 10, in transmitted light within the visible spectrum, provides a simple and effective means by which any holder may verify the authenticity of the document under ordinary light conditions.

Security paper in accordance with the foregoing description was prepared and tested. Results of those tests are summarized in the following four examples and in Table 1, along with results of similar tests on commercially available security papers. Because certain of the tests may have been performed in accordance with non-standard test methodologies, these results are provided for comparative purposes only. Moreover, as will be recognized by those skilled in the art, the results of such tests may not always be reproducible as between testing machines and laboratories.

Tests on the physical and optical properties of the papers was performed in an atmosphere of 50 to 51% humidity and at a temperature of between 22.5° and 23° C.

Smoothness was tested in accordance with the Bekk method on equipment manufactured by Karl Frank GmbH of Germany, and is reported in seconds (sec). The Bekk method is summarized in test specification number T 479 om-86 of the Technical Association of Pulp and Paper Industry (TAPPI).

Rigidity was tested on a Büchel stiffness tester, and results are reported in millinewtons (mN) of force.

Breaking strength was tested in accordance with the Mullen test method on equipment manufactured by Karl Frank GmbH. The Mullen test method is summarized in test specification number T 403 om-85 of the TAPPI. Results are reported in kilopascals (kPa).

Tearing strength was tested in accordance with the Elmendorf method on equipment manufactured by Lorentzen-Wettre of Sweden on paper samples measuring 65×80 millimeters. The Elmendorf method is summarized in test specification number T 414 om-88 of the TAPPI. Results are reported in decanewtons (daN).

Opacity was tested on an Elrepho Datacolor 200 test machine, and results are reported in percent (%).

Finally, the average number of double folds was determined using equipment manufactured by Karl Frank GmbH, with a weight of 1 kilopond. Results are reported in the number of double folds before breaking.

EXAMPLE 1

A portrait of a historical figure was used for the motif of a color mark in the form of a line drawing. A polyester substrate sheet, 12 microns thick, available under the tradename Yuborlen, was given a corona treatment on both sides, and the color mark and a color test spectrum were printed in four basic colors by rotogravure printing. Paper sheets, made of cotton fibers and having a basis weight of 32 g/m$^2$, were laminated successively on each side of the substrate sheet using polyurethane based adhesive commercially available under the tradename Novacote ADH 222 from ICI of Great Britain.

EXAMPLE 2

A color icon was color separated and printed in four colors on the same type of polyester substrate as in example 1. Paper made of hemp fiber, with a basis weight of 30 g/m$^2$, was laminated to both sides of the substrate sheet as in the previous example.

EXAMPLE 3

The portrait of the historical figure and the icon of the previous two examples were printed by five color rotogravure printing on the same type of substrate used in the previous examples. Paper comprising cotton fibers and wood cellulose, and having a basis weight of 35 g/m$^2$, were laminated to both sides of the substrate sheet using the polyurethane adhesive of the previous examples.

EXAMPLE 4

For this example, a polyester film, 12 microns thick and with a basis weight of 16.9 g/m$^2$, available under the tradename Mylar, was used. A multicolor, semihue ornament with a single color text in red, blue and black, and a single color continuous ornament of white, opaque ink, similar to a water mark, were printed the film by rotogravure printing. The printed substrate film was laminated with paper sheets having a basis weight of 36 g/m$^2$ and consisting of 75% cotton fibers and 25% wood cellulose, using Novacote ADH 222 adhesive as before.

As the figures in Table 1 indicate, the security paper produced in the examples exhibits physical and optical properties comparable to, or exceeding commercially available security papers. In particular, the present security paper has excellent strength and durability characteristics, including a greatly enhanced folding endurance. The indicia printed on the substrate is substantially undetectable under reflected light and no showthrough is apparent. When viewed in transmitted light within the visible spectrum, the substrate indicia are clearly visible.

TABLE 1

| | PORTALS [Great Britain] | ARJOMARI [France] | LOUISENTHAL [Germany] | EXAMPLE 1 | EXAMPLE 2 | EXAMPLE 3 | EXAMPLE 4 |
|---|---|---|---|---|---|---|---|
| BASIS WEIGHT [gr/m$^2$] | 83 | 80 | 82 | 84 | 85 | 88 | 93 |
| THICKNESS [mm] | 0.108 | 0.100 | 0.098 | 0.095 | 0.096 | 0.104 | 0.111 |
| SMOOTHNESS [sec] | 9.3 | 12.6 | 10.5 | 10.8 | 11.3 | 11.7 | 12.03 |
| RIGIDITY [mN; 10 mm, 15°] | 93 | 100 | 98.7 | 70 | 71 | 76 | 74 |
| BREAKING | 463 | 425 | 432 | 415 | 420 | 435 | 495 |

TABLE 1-continued

| | PORTALS [Great Britain] | ARJOMARI [France] | LOUISENTHAL [Germany] | EXAMPLE 1 | EXAMPLE 2 | EXAMPLE 3 | EXAMPLE 4 |
|---|---|---|---|---|---|---|---|
| STRENGTH [kPa] | | | | | | | |
| TEARING STRENGTH [daN] | 12.16 | 11.87 | 11.90 | 12.40 | 12.47 | 12.75 | 13.43 |
| OPACITY [%] | 88.19 | 89.50 | 85.31 | 89.85 | 91.70 | 88.60 | 93.23 |
| AVERAGE NO. OF DOUBLE FOLDS | 1097 | 1570 | 1465 | over 2000 | over 2000 | over 2000 | over 2000 |

We claim:

1. A security paper comprising:
a resinous substrate sheet having two faces;
transparent indicia disposed on one of said faces of said resinous substrate sheet; and,
a first and a second paper sheet, said first paper sheet being permanently laminated on one of said faces of said resinous substrate sheet, and said second paper sheet being permanently laminated on the other of said faces of said resinous substrate sheet, whereby said indicia are substantially undetectable when viewed in reflected light and are apparent through said paper sheets when viewed in transmitted light.

2. The security paper as set forth in claim 1, wherein said paper sheets are permanently laminated on each of said faces of said substrate sheet by means of an adhesive.

3. The security paper as set forth in claim 1, wherein said indicia include at least one color region, the color of said region corresponding to a wavelength of light of from 380 to 720 nanometers.

4. The security paper as set forth in claim 3 further comprising a first layer of substantially opaque ink disposed under said indicia and a second layer of substantially opaque ink disposed over said indicia.

5. The security paper as set forth in claim 1, wherein a portion of said resinous substrate sheet is metallized.

6. The security paper as set forth in claim 1, wherein a portion of said resinous substrate sheet is perforated.

7. The security paper as set forth in claim 1, further comprising microtext disposed on said resinous substrate sheet.

8. The security paper as set forth in claim 1, wherein said indicia are printed on said resinous substrate sheet with transparent ink.

9. The security paper as set forth in claim 8, wherein at least a portion of said indicia is printed in color.

10. The security paper as set forth in claim 1, wherein at least a portion of said indicia is printed on said resinous substrate sheet with fluorescent ink.

11. The security paper as set forth in claim 1, wherein at least a portion of said indicia is printed on said resinous substrate sheet in ultraviolet ink, said portion of said indicia being substantially undetectable under light within the visible spectrum and visible when viewed under ultraviolet light.

12. The security paper as set forth in claim 1, wherein at least a portion of said indicia is printed on said resinous substrate sheet with phosphorescent ink.

13. The security paper as set forth in claim 1, wherein said resinous substrate sheet comprises a resinous material selected from the group consisting of polyester, polypropylene and cellophane.

14. The security paper as set forth in claim 1, wherein said resinous substrate sheet has a basis weight included in a range from 11.0 to 22.5 grams per square meter inclusive.

15. The security paper as set forth in claim 1, wherein each of said paper sheets has a basis weight included in a range from 19 to 50 grams per square meter inclusive, a thickness included in a range from 0.038 to 0.050 millimeters inclusive, and an opacity included in a range from 75 to 85 percent inclusive.

16. The security paper as set forth in claim 1, wherein each of said paper sheets comprises fibrous material selected from the group consisting of wood fibers, cotton fibers, flax fibers, and hemp fibers.

17. A laminated security paper comprising:
a resinous substrate layer having a first face and a second face;
color indicia printed on said first face of said substrate layer with transparent ink, said color indicia including at least one region having a color corresponding to a wavelength of light of from 380 to 720 nonometers;
a first layer of adhesive disposed on said first face of said substrate layer, over said color indicia;
a second layer of adhesive disposed on said second face of said substrate layer;
a first layer of paper disposed over said first adhesive layer and fixed permanently to said substrate layer and said color indicia by said first adhesive layer; and
a second layer of paper disposed over said second adhesive layer and fixed permanently to said substrate layer by said second adhesive layer.

18. The laminated security paper as set forth in claim 17 further comprising a first white layer disposed under said color indicia, and a second white layer disposed over said color indicia.

19. The laminated security paper as set forth in claim 17, wherein said resinous substrate layer has a basis weight included in a range from 11.0 to 22.5 grams per square meter inclusive, and wherein each of said paper layers has a basis weight included in a range from 19 to 50 grams per square meter inclusive, a thickness included in a range from 0.038 to 0.050 millimeters inclusive, and an opacity included in a range from 75 to 85 percent inclusive.

20. The laminated security paper as set forth in claim 17, wherein at least a portion of said color indicia is printed on said resinous substrate layer with fluorescent ink.

21. The laminated security paper as set forth in claim 17, wherein at least a portion of said color indicia is printed on said resinous substrate layer with phosphorescent ink.

22. The security document comprising:
a resinous substrate sheet having two faces;

transparent indicia disposed on one of said faces of said resinous substrate sheet;

a first and a second paper sheets, each of said paper sheets having an inner face and an outer face, one of said paper sheets being permanently laminated on a respective face of said resinous substrate sheet by means of an adhesive applied between said respective face of said substrate sheet and said inner face of each of said paper sheets; and a set of indicia printed on at least one of said outer faces of said paper sheets, whereby said transparent indicia on said substrate sheet cooperate with said set of indicia to form a total image when viewed in transmitted light.

23. The security document as set forth in claim 22, wherein at least a portion of said indicia printed on said outer face of said paper sheet become substantially invisible when viewed in transmitted light.

24. The security document as set forth in claim 22, wherein said set of indicia disposed on said outer face of said paper sheet is in register with said indicia on said substrate sheet.

25. The security document as set forth in claim 22 further comprising a first layer of substantially opaque ink disposed under said transparent indicia and a second layer of substantially opaque ink disposed over said transparent indicia.

26. The security document as set forth in claim 22, wherein each of said paper sheets has an opacity of from 75 to 85 inclusive.

27. The security document as set forth in claim 22, wherein said resinous substrate sheet has a basis weight included in a range from 11.0 to 22.5 grams per square meter inclusive, and wherein each of said paper sheets has a basis weight included in a range from 19.0 to 50.0 grams per square meter inclusive and a thickness included in a range from 0.038 to 0.050 millimeters inclusive.

28. The security document as set forth in claim 22, wherein said transparent indicia include at least one color region, the color of said region corresponding to a wavelength of light of from 380 to 720 nanometers.

29. The security document as set forth in claim 22, wherein a portion of said resinous substrate sheet is metallized.

30. The security document as set forth in claim 22, wherein a portion of said resinous substrate sheet is perforated.

31. The security document as set forth in claim 22, further comprising microtext disposed on said resinous substrate sheet.

32. The security document as set forth in claim 22, wherein said indicia are printed on said resinous substrate sheet with transparent ink.

33. A method for manufacturing a security paper comprising the steps of:

defining a graphic design in color;

printing said graphic design on a resinous substrate sheet as a substantially transparent color image; and, permanently laminating said printed substrate sheet between two paper sheets by means of an adhesive.

34. The method as set forth in claim 33, comprising the further step of metallizing a portion of said resinous substrate sheet prior to said laminating step.

35. The method as set forth in claim 33, comprising the further step of perforating said resinous substrate sheet prior to said laminating step.

36. The method as set forth in claim 33, comprising the further step of printing a microtext on said resinous substrate sheet prior to said laminating step.

37. The method as set forth in claim 33, wherein at least a part of said graphic design is printed on said substrate sheet with fluorescent ink.

38. The method as set forth in claim 33, wherein said graphic design is printed on said resinous substrate sheet by a rotogravure printing process.

39. The method as set forth in claim 33 further comprising disposing a first layer of substantially opaque ink under said graphic design and disposing a second layer of substantially opaque ink over said graphic design.

40. The method as set forth in claim 33, wherein at least a portion of said graphic design is printed on said substrate sheet with phosphorescent ink.

41. A method for manufacturing a security document comprising the steps of:

defining a graphic design in color;

printing said graphic design on a resinous substrate sheet as a substantially transparent color image;

permanently laminating said printed substrate sheet between two paper sheets by means of an adhesive; and printing a set of indicia on an outer surface of at least one of said paper sheets, whereby said graphic design on said substrate sheet cooperates with said set of indicia to form a total image when viewed in transmitted light.

42. The method as set forth in claim 41 wherein said set of indicia is printed on said outer surface of at least one of said paper sheets by intaglio printing.

43. The method as set forth in claim 41, comprising the further step of metallizing a portion of said resinous substrate sheet prior to said laminating step.

44. The method as set forth in claim 41, comprising the further step of perforating a portion of said resinous substrate sheet prior to said laminating step.

45. The method as set forth in claim 41, comprising the further step of printing a microtext on said resinous substrate sheet prior to said laminating step.

46. The method as set forth in claim 34, wherein said graphic design is printed on said resinous substrate sheet by a rotogravure printing process.

* * * * *

UNITED STATES PATENT AND TRADEMARK OFFICE
CERTIFICATE OF CORRECTION

PATENT NO. : 5,449,200

DATED : September 12, 1995

INVENTOR(S) : Dragisa Andric and Borislav Stojanovic

It is certified that error appears in the above-identified patent and that said Letters Patent is hereby corrected as shown below:

Column 19, Line 20: Delete disposed.

Signed and Sealed this

Sixteenth Day of January, 1996

Attest:

BRUCE LEHMAN

*Attesting Officer*     *Commissioner of Patents and Trademarks*